US010806158B2

(12) United States Patent
Döring

(10) Patent No.: US 10,806,158 B2
(45) Date of Patent: Oct. 20, 2020

(54) LOW-MINERAL QUARK MATRIX

(71) Applicant: DMK Deutsches Milchkontor GmbH, Zeven (DE)

(72) Inventor: Sven-Rainer Döring, Zeven (DE)

(73) Assignee: DMK Deutsches Milchkontor GmbH, Zeven (DE)

( * ) Notice: Subject to any disclaimer, the term of this patent is extended or adjusted under 35 U.S.C. 154(b) by 208 days.

(21) Appl. No.: 15/995,305

(22) Filed: Jun. 1, 2018

(65) Prior Publication Data
US 2019/0116825 A1  Apr. 25, 2019

(30) Foreign Application Priority Data

Oct. 24, 2017  (EP) .................................. 17197961

(51) Int. Cl.
*A23C 9/142* (2006.01)
*A23C 9/144* (2006.01)
(Continued)

(52) U.S. Cl.
CPC ............ *A23C 19/0285* (2013.01); *A23C 7/04* (2013.01); *A23C 9/144* (2013.01); *A23C 9/1422* (2013.01); *A23C 9/1427* (2013.01); *A23C 9/1512* (2013.01); *A23C 19/0323* (2013.01); *A23C 19/0326* (2013.01); *A23C 19/05* (2013.01); *A23C 19/076* (2013.01); *B01D 61/025* (2013.01); *B01D 61/58* (2013.01); *A23C 2200/00* (2013.01); *A23C 2210/202* (2013.01); *A23C 2210/206* (2013.01); *A23C 2210/252* (2013.01); *A23Y 2240/21* (2013.01); *A23Y 2240/25* (2013.01); *A23Y 2240/41* (2013.01);
(Continued)

(58) Field of Classification Search
CPC .......... A23C 9/142; A23C 9/1422; A23C 9/12
USPC ........................................................ 426/580
See application file for complete search history.

(56) References Cited

U.S. PATENT DOCUMENTS

| 5,013,573 A | 5/1991 | Bodor et al. |
| 2007/0166447 A1 | 7/2007 | Ur-Rehman et al. |
| 2015/0050386 A1* | 2/2015 | Schomacker ........ A23C 19/076 426/43 |

FOREIGN PATENT DOCUMENTS

DE  28 22 000 A1  5/1978
EP  0 056 658 A2  7/1982
(Continued)

OTHER PUBLICATIONS

Schkoda et al, "Das Neue FML-Frischkäseverfahren," Deutsche Milchwirtschaft vol. 48, No. 1 (Jan. 1, 1997), pp. 36-41.

*Primary Examiner* — Jeffrey P Mornhinweg
(74) *Attorney, Agent, or Firm* — Dilworth & Barrese, LLP

(57) ABSTRACT

A low-mineral quark matrix is suggested, which is obtainable by
(a) subjecting raw milk to heat treatment, separating the cream,
(b) subjecting the skimmed milk such obtained to an ultrafiltration step and/or a reverse osmosis step, producing a retentate R1, which represents a dairy protein concentrate, and a permeate P1,
(c) subjecting the permeate P1 to an electrodialysis step, producing a salt-depleted diluate D1,
(d) combining the diluate D1 with the retentate R1,
(e) subjecting the combination product such obtained to heat treatment until denaturation sets in,
(f) fermenting the denaturation product such obtained by the addition of starter cultures and rennet, and (Continued)

(g) adjusting or standardising the fermentation product such obtained to defined dry matter and protein contents.

13 Claims, 1 Drawing Sheet

(51) Int. Cl.

| | | |
|---|---|---|
| A23C 9/12 | (2006.01) | |
| A23C 19/028 | (2006.01) | |
| A23C 19/032 | (2006.01) | |
| A23C 19/05 | (2006.01) | |
| A23C 19/076 | (2006.01) | |
| A23C 9/15 | (2006.01) | |
| B01D 61/02 | (2006.01) | |
| B01D 61/58 | (2006.01) | |
| A23C 7/04 | (2006.01) | |
| B01D 61/14 | (2006.01) | |
| B01D 61/42 | (2006.01) | |
| B01D 63/10 | (2006.01) | |

(52) U.S. Cl.
CPC ....... *A23Y 2240/75* (2013.01); *A23Y 2260/00* (2013.01); *B01D 61/027* (2013.01); *B01D 61/142* (2013.01); *B01D 61/422* (2013.01); *B01D 63/10* (2013.01)

(56) References Cited

FOREIGN PATENT DOCUMENTS

| | | |
|---|---|---|
| EP | 1 031 288 A1 | 8/2000 |
| EP | 2 796 051 A1 | 10/2014 |
| EP | 2 839 747 A1 | 2/2015 |
| EP | 2 839 748 A1 | 2/2015 |
| EP | 2 839 749 A1 | 2/2015 |
| WO | 01/93689 A1 | 12/2001 |
| WO | 2015/099960 A1 | 7/2015 |

* cited by examiner

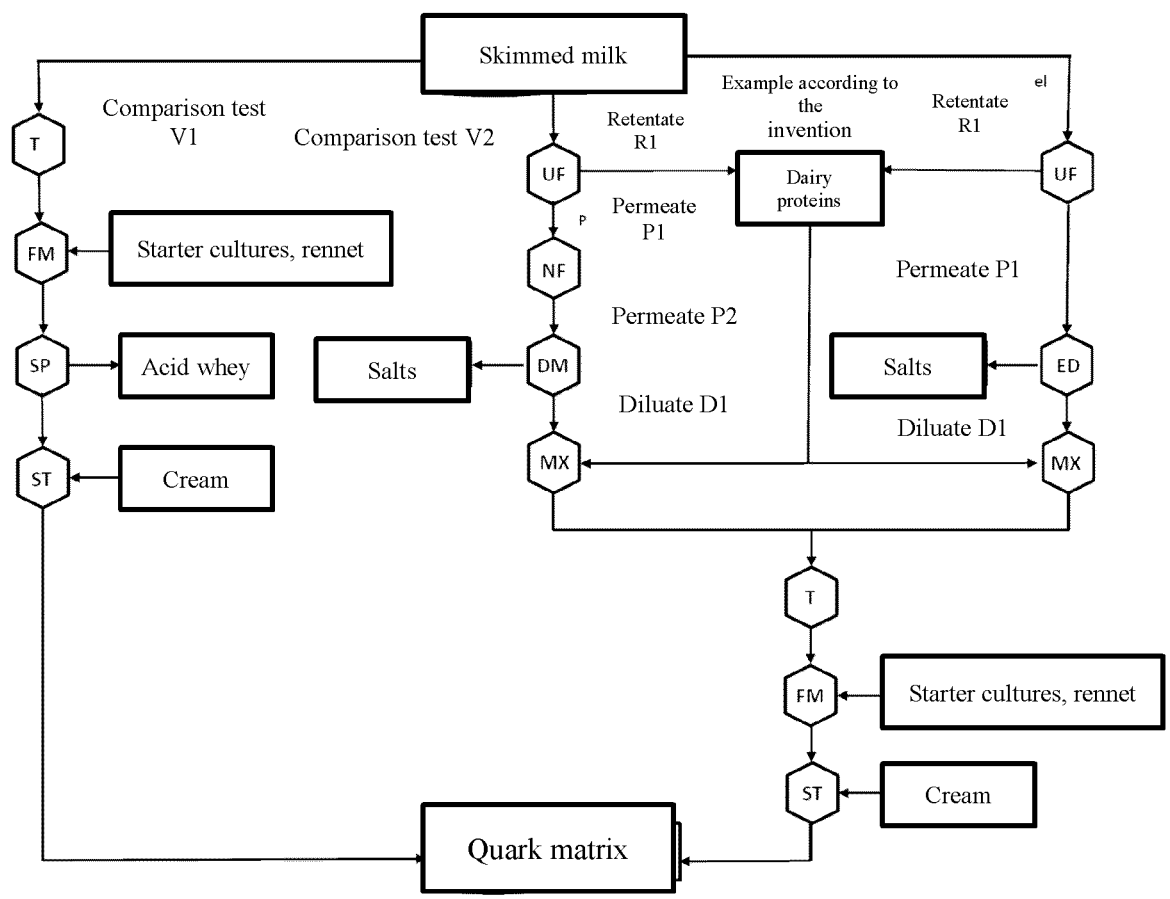

LOW-MINERAL QUARK MATRIX

FIELD OF THE INVENTION

The invention is in the field of dairy products and relates to a quark matrix, exhibiting an improved taste and having a reduced sodium content, a process for its production, and foods containing the matrix.

STATE OF THE ART

For the production of quark or fresh cheese—these two terms will be used synonymously in the following—skimmed milk is typically subjected to heat treatment, denaturing the proteins contained therein.

As a result of the subsequent addition of lactic acid bacteria and rennet, the so-called coagulation (phase inversion) of the milk is performed. Casein is coagulated, forming the technically termed curd. After ripening (8 to 20 h), the curd is stirred. This process initiates the separation of whey, and the two phases are then separated in a separator. The liquid acid whey is processed otherwise, and the quark matrix is adjusted to the desired fat and protein contents by adding cream.

The technical methods of production are dominated by corresponding separation processes. By varying the conditions of separation and through technical modifications of the separators, it is currently possible to offer a variety of process configurations. With a protein content of the skimmed milk of 3.3 to 3.5% by weight, the use of skimmed milk is within the range of 4.10 to 4.15 kg skimmed milk per kilogramme of low-fat quark or fresh cheese to be produced (4.10 to 4.15 kg skimmed milk/kg low-fat quark), if the latter has a dry matter content of 18%. Thus, 3.10 to 3.15 kg acid whey are produced per kilogramme of low-fat quark (3.10 to 3.15 kg acid whey/kg low-fat quark). In this process, the protein content reaches a size of 12.6 to 12.8% by weight.

In addition to the methods of production that are characterised by separation, methods are known wherein the concentration of the fermented process milk is performed by ultrafiltration. For example, it is known from US 2003/0129275 A1 (LACT INNOVATION) that microfiltration steps and ultrafiltration steps may also be used for the production of cheese and quark. The application of microfiltration to skimmed milk for the production of cheese and whey protein products is described, for example, in US 2003/0077357 A1 (CORNELL RES FOUNDATION).

EP 1752046 A1 (TUCHENHAGEN) discloses a process for the production of fermented dairy products, wherein process milk is fermented, the fermentation product is subjected to a microfiltration step, and only the acidified retentate is processed further.

In their paper, entitled "*The pre-concentration of milk by nanofiltration in the production of Quark-type fresh cheeses*", MUCCHATTO ET AL describe the influence of using a previously nanofiltrated milk on the properties of quark that is produced from this nanofiltrated milk. Preliminary tests of the nanofiltration process were performed using aqueous solutions of NaCl, CaCl$_2$, MgSO$_4$, Na$_2$SO$_4$, lactose, and whole milk. The manufacturing route corresponds to the standard method of production of quark, wherein merely a retentate from a nanofiltration step of whole milk is used, instead of using skimmed milk within the meaning of the present application [cf. LAIT VOL. 80 (1), p 43-50 (2000)].

In DEUTSCHE MILCHWIRTSCHAFT VOL 48(2), p 36-41 (1997), a process for the production of fresh cheese is disclosed, wherein skimmed milk is concentrated by means of nanofiltration. The milk is subsequently heated at a temperature of 80° C. for seven minutes, is subsequently stirred into a selected combination of cultures at 30° C., and is then allowed to ferment for 14 to 16 hours. After fermentation, the desired dry matter of the final product is adjusted by ultrafiltration or separation.

EP 1364582 A1 relates to an acidified dairy product having milk and/or skimmed milk and/or whey as its main component. Specifically, acidified dairy products are claimed, which are obtained by removal of monovalent ions and water by means of nanofiltration from the primary dairy products and/or whey products.

A particular problem in the context of the production of fresh cheese is producing matrices that have a neutral taste. When skimmed milk is pre-concentrated by means of ultrafiltration in order to form a quark matrix, which is subsequently acidified, the product has a very bitter taste and is not acceptable from a sensory perspective. This sensory deviation is particularly induced by the presence of phosphates. Alkali metal ions, particularly sodium, tend to cause a metallic taste. The methods for concentrating non-acidified skimmed milk to obtain quark of the state of the art have not been capable of quantitatively separating phosphates and alkali metal ions yet, with amounts thereof remaining in the product such that an adverse taste cannot be prevented.

Further, acid whey is generated in the conventional production of quark as a by-product, which is complex to remove from the curd and which only has limited possibilities of use.

One way to improve the taste properties is in the use of particular starter cultures which contribute to masking the perception of a bitter taste (cf. EP 2839748, EP 2839749 A1, DMK), which, however, does not change any of the presence of those bitter principles—and which certainly does not solve the problem of the by-product of acid whey. If it is intended to factually separate the bitter principles—also against the background of low-sodium products—there must be another way.

For example, in order to improve the taste quality of fresh cheese or quark, EP 2796051 A1 (DMK) suggests to initially subject skimmed milk to a coupled ultrafiltration and nanofiltration, subjecting the permeate obtained to demineralisation as a result of a precipitation reaction, and to combine the low-mineral filtrate with the high-protein retentate from the ultrafiltration step before denaturing, fermenting, and standardising this mixture. This process, however, has a disadvantage in that the separation of monovalent cations, specifically sodium, is not performed completely and the resulting product thus has a residual bitterness. In addition, the precipitation of the calcium salts is technically complex and quite expensive.

The object of the present invention was therefore to provide a quark matrix having a reduced mineral content, particularly a reduced sodium content (below 50 ppm, preferably below 10 ppm) and improved sensory and taste properties at the same time, specifically with regard to the teaching of EP 2796051 A1 stated above, which is ready to fill and ready to eat without the addition of additives. Simultaneously, it should be possible to perform the corresponding method of production without that acid whey is produced as a waste by-product.

DESCRIPTION OF THE INVENTION

A first subject matter of the invention relates to a low-mineral quark matrix, which is obtainable or obtained by (a) subjecting raw milk to heat treatment, separating the cream,
(b) subjecting the skimmed milk such obtained to an ultrafiltration step and/or a reverse osmosis step, producing a retentate R1, which represents a dairy protein concentrate, and a permeate P1,
(c) subjecting the permeate P1 to an electrodialysis step, producing a salt-depleted diluate D1,
(d) combining the diluate D1 with the retentate R1,
(e) subjecting the combination product such obtained to heat treatment until denaturation sets in,
(f) fermenting the denaturation product such obtained by the addition of starter cultures and rennet, and
(g) adjusting or standardising the fermentation product such obtained to defined dry matter and protein contents.

Another subject matter of the present invention is a corresponding process for the production of a low-mineral quark matrix, comprising the following steps:
(a) producing a skimmed milk by heat treatment of raw milk and separation of the cream;
(b) subjecting the skimmed milk such obtained to an ultrafiltration and/or reverse osmosis step, obtaining a retentate R1, which represents a dairy protein concentrate, and a permeate P1,
(c) subjecting the permeate P1 to an electrodialysis step, obtaining a salt-depleted diluate D1,
(d) combining the diluate D1 with the retentate R1,
(e) heat treatment of the combination product such obtained until denaturation sets in,
(f) fermenting the denaturation product such produced by adding starter cultures and rennet, and
(g) adjusting or standardising the fermentation product such obtained to defined dry matter and protein contents.

Surprisingly, it was found that the object has been completely achieved by subjecting skimmed milk to a combination of ultrafiltration (or reverse osmosis) and electrodialysis, before subsequently mixing the fractions such obtained, as described above, and processing them any further.

Electrodialysis has not been applied in the cheese-making field yet and is therefore not an obvious technology in the production of cheese/fresh cheese. Merely demineralising the starting milk by means of electrodialysis does not lead to the desired result, mainly with regard to reducing the production of acid whey. The combination of these technologies represents the new technical teaching.

In contrast to a combination of ultrafiltration, nanofiltration, and precipitation steps, the process of the invention proves to be technically less complex and is faster; in the process of dialysis, surprisingly, not only divalent, but also monovalent ions are practically completely removed, leading to products having a clearly lower sodium content and, simultaneously, an improved taste quality. The sodium values are typically within the range of 5 to 50 ppm.

BRIEF DESCRIPTION OF THE DRAWING

The present invention will be described in greater detail with reference to the accompanying drawing which illustrates the process for production of the low-mineral quark matrix in accordance with the present invention.

Production of Skimmed Milk

In order to produce skimmed milk, a separation of non-dairy components and the skimming of the fat content of about 4% by weight from the raw milk is initially performed. This is usually carried out in a special component, preferably a separator. Said components are adequately known from the state of the art. Separators of the company GEA Westfalia Separator GmbH, which allow that these steps may be performed together or individually, are widely used in the dairy industry[1]. Corresponding components have also been disclosed, for example, in DE 10036085 C1 (Westfalia) and are perfectly known to one skilled in the art. Therefore, no explanations are needed on how to carry out these process steps, as they are understood to be part of the general specialist knowledge.

[1] (http://www.westfalia-separator.com/de/anwendungen/molkereitechnik/milch-molke.html).

Heat treatment of the raw milk is preferably carried out in heat exchangers, in which case, specifically, plate heat exchangers have proved to be particularly suitable. There is a temperature gradient at the heat exchangers, which, however, is selected such that the raw milk is heated to a temperature of about 70 to 80° C., and particularly of about 72 to 74° C. for a residence time of a minimum of 20 and a maximum of 60 seconds, preferably about 30 seconds.

Ultrafiltration and Reverse Osmosis

In a second process step, the skimmed milk is separated into a dairy protein concentrate, which is produced as a retentate, and a dairy permeate by means of an ultrafiltration step.

Filtration through membranes having a pore size <0.1 µm is usually referred to as ultrafiltration, while filtration at pore sizes >0.1 µm is commonly referred to as microfiltration. In both cases, this concerns purely physical, i.e., mechanical membrane separation methods which apply the principle of mechanical size exclusion: all particles in the fluids which are larger than the membrane pores are retained by the membrane. The driving force in both separation methods is the differential pressure between the inlet and the outlet of the filter area, which is between 0.1 and 10 bar. Depending on the area of application, the filter area material may consist of stainless steel, synthetic material, ceramics or textile fabric. Filter elements appear in different forms: candle filters, flat membranes, spiral coil modules, bag filters and hollow fibre modules, all of which are, in principle, suitable within the meaning of the present invention.

Ultrafiltration is preferably performed at temperatures within the range of about 10 to about 55° C., preferably about 10 to 20° C., with membranes preferably having an average pore size within the range of about 1,000 to about 50,000 Dalton, more particularly about 5,000 to about 25,000 Dalton. Preferably, the membranes are so-called spiral coil modules or plate and frame modules made of polysulfone or polyethylene membranes.

Reverse osmosis represents an alternative to ultrafiltration. In this process, the skimmed milk is dehydrated using a semi-permeable membrane, increasing the concentration of the valuable dairy proteins as a result. The principle of the process is that the system is subjected to a pressure which must be higher than the pressure created by the osmotic pressure for concentration equilibration. As a result of this, the molecules of the solvent can migrate in the opposite direction to their "natural" osmotic spreading direction. The pressure forces them into the compartment in which dissolved substances are present in a less concentrated form. Milk has an osmotic pressure of less than 2 bar, the pressure applied for reverse osmosis of milk is 3 to 30 bar, depending on the membrane used and the configuration of the equipment. The osmotic membrane through which only the carrier liquid (solvent) is allowed to pass, retaining the dissolved substances (solute), must be able to withstand these high pressures. In case the pressure difference more than balances the osmotic gradient, the molecules of the solvent are passing through the membrane just like in a filter, while the milk molecules are retained. In contrast to a classic membrane filter, osmotic membranes do not have through pores. Reverse osmosis is preferably performed at a temperature within the range of 10 to 55, more particularly, 10 to 20° C. with semi-permeable membranes having a cut-off of 0 to 1,000 Dalton.

Electrodialysis

Electrodialysis is an electro-chemically driven membrane process in which ion exchanger membranes are used in combination with an electric potential difference to separate ionic species from uncharged solvents, or from contaminations. To this end, the space between two electrodes in an electrodialysis separator is separated by a stack of alternating anion and cation exchanger membranes. Each pair of ion exchanger membranes forms a separate "cell". In technical systems, these stacks consist of more than two hundred membrane pairs. If a direct electric current is applied to the electrodes, the anions migrate to the anode. The anions may simply pass the positively charged anion exchanger membranes but they are stopped at the respective negatively charged cation exchanger membrane. As the same process (obviously with opposite signs) is performed with the cations, the net effect of electrodialysis is a concentration of salts in the cells with odd numbers (anion exchanger membrane/cation exchanger membrane), while the cells with even numbers (cation exchanger membrane/anion exchanger membrane) suffer a depletion of salt. The solutions with increased salt concentrations are combined to form the concentrate, while the salt-depleted solutions form the diluate. It is recommended to finally treat the diluate with a cation exchanger ("polisher") and, particularly, to separate any sodium ions that had been introduced by dialysis.

By means of electrodialysis, dilutes are obtained having a reduced sodium content of up to 95% by weight in comparison with the permeate used.

Denaturation

In the following step, the high-protein fraction from the ultrafiltration step, i.e., the retentate, is combined with the diluate from the electrolysis step, and is subjected to heat treatment. The denaturation now performed may be carried out by a method known in itself, namely, for a period of about 5 to about 10 min, and preferably about 6 min, and at temperatures of about 85 to about 90° C., more particularly about 88° C.

Fermentation and Standardisation

Also the fermentation of the denatured precursor can be performed according to the known methods of the state of the art. To this end, suitable starter cultures, preferably, lactic acid bacteria, and rennet, are added. Suitable starter cultures are particularly probiotic bacteria of the type *Bifido bacterium lactis* B12 or *Lactobacillus acidophilus* as well as mesophilic bacteria such as, for example, *Lactococcus lactis* or *Leuconostoc cremoris*.

Further, the two following cultures are particularly preferred, which consist of 5 or 3 probiotic bacteria, namely:

Mixture 1
(i-1) *Streptococcus thermophilus,*
(i-2) *Leuconostoc* species,
(i-3) *Lactococcus lactis* subsp. *lactis biovar diacetylactis,*
(i-4) *Lactococcus lactis* subsp. *lactis* and
(i-5) *Lactococcus lactis* subsp. *cremoris,* and Mixture 2
(ii-1) *Streptococcus thermophilus,*
(ii-2) *Lactococcus lactis* subsp. *lactis* and
(ii-3) *Lactococcus lactis* subsp. *cremoris*

Preferably, the starter cultures contain about 10 to about 90% by weight, preferably about 25 to about 75% by weight and more particularly about 40 to about 60% by weight of mixture (i), and about 90 to about 10% by weight, preferably about 75 to about 25% by weight and more particularly about 60 to about 40% by weight of mixture (ii)

with the proviso that the quantities add up to 100% by weight.

Particularly preferred are starter cultures, containing
about 40 to about 60% by weight of mixture (i), and
about 60 to about 40% by weight of mixture (ii)
with the proviso that the quantities add up to 100% by weight.

In another preferred embodiment, the five microorganisms forming mixture (i) and the three microorganisms forming mixture (ii) are each contained in about the same quantities. "About the same" in this context is to be understood as meaning that in mixture (i) the five microorganisms are each contained in quantities of 20±5% by weight, and in mixture (ii) the three microorganisms are each contained in quantities of 33±5% by weight. Instead of employing the commercially available preparations (i) and (ii) together, it is, in principle, certainly also possible to use the five microorganisms individually, mixing them such that a mixture of starter cultures is obtained, by means of which quark products having an improved taste are obtained. Those starter cultures preferably contain about 20 to about 30% by weight *Streptococcus thermophilus,* about 5 to about 15% by weight *Leuconostoc* species, about 5 to about 10% by weight *Lactococcus lactis* subsp. *lactis biovar diacetylactis,* about 20 to about 30% by weight *Lactococcus lactis* subsp. *lactis,* about 20 to about 30% by weight *Lactococcus lactis* subsp. *cremoris,* and with the proviso that the quantities add up to 100% by weight.

Particularly preferred are starter cultures, containing
25% by weight *Streptococcus thermophilus,*
12% by weight *Leuconostoc* species,
13% by weight *Lactococcus lactis* subsp. *lactis biovar diacetylactis,*
25% by weight *Lactococcus lactis* subsp. *lactis,*
25% by weight *Lactococcus lactis* subsp. *cremoris*

All microorganisms mentioned are commercially available.

The temperature at which fermentation is performed depends on the range of temperature which is optimal for the microorganisms used in each case; typically, the temperature is within the range of about 18 to about 35° C., and preferably at about 30° C.

The quark matrix obtained after fermentation is subsequently adjusted to the desired dry matter and protein contents, for example, by the addition of cream (about the fraction obtained during the production of the skimmed milk). Preferably, the dry matter content is about 15 to about 20% by weight, and more particularly about 18% by weight. The protein content may be about 10 to about 15% by weight, and preferably about 12% by weight.

INDUSTRIAL APPLICABILITY

A further subject matter of the present invention relates to low-sodium foods, containing the quark matrices according to the invention. This is to be understood as meaning that the matrices themselves represent a component of the food, for example, of a fresh cheese preparation or a quark dish, or are used as an ingredient in the process of the production of the food, for example, in the production of quark (cheese) cake.

EXAMPLES

Comparison Example V1

4,000 kg skimmed milk were treated at 88° C. for 6 min, denaturing the products obtained. Lactic acid bacteria according to mixture (i) and rennet were added to the matrix, which was allowed to ripen at 30° C. for about 18 h and subsequently stirred. Subsequently, the fermentation product was placed into a centrifuge, separating ca. 3.2 kg acid whey as a liquid component. The remaining quark matrix (ca. 800 kg) was adjusted to a fat content of 40% by weight in the dry matter and a protein content of 12% by weight by adding cream.

Comparison Example V2 (Analogous to EP 2796051 A1)

4,000 kg skimmed milk were subjected to an ultrafiltration step using a spiral coil membrane (cut-off 25,000 Dalton) at 20° C. The high-protein retentate was separated, and the permeate was subjected to a nanofiltration step using a spiral coil membrane at 20° C. (cut-off 500 Dalton). Sodium salts and potassium salts were separated along with the permeate. Subsequently, the retentate was treated by adding an aqueous calcium chloride solution that had been adjusted to pH=6 using NaOH, precipitating the phosphates as calcium phosphate. The permeate such obtained was combined with the high-protein retentate from the first step, it was treated at 88° C. for 6 min, denaturing the proteins contained therein. Lactic acid bacteria according to mixture (i) and rennet were added to the matrix, which was stirred at 30° C. for about 2 h. Subsequently, the fermentation product was placed into a centrifuge, separating the acid whey as a liquid component. The remaining quark matrix was adjusted to a fat content of 40% by weight in the dry matter and a protein content of 12% by weight by adding cream.

Example 1

4,000 kg skimmed milk were subjected to an ultrafiltration step using a spiral coil membrane (cut-off 25,000 Dalton) at 20° C. The high-protein retentate was separated, and the permeate was subjected to an electrodialysis step with a subsequent cation exchanger treatment at 20° C. The diluate such obtained was combined with the high-protein retentate from the first step, it was treated at 88° C. for 6 min, denaturing the proteins contained therein. Lactic acid bacteria according to mixture (i) and rennet were added to the matrix, which was stirred at 30° C. for about 2 h. Subsequently, the fermentation product was placed into a centrifuge, separating the acid whey as a liquid component. The remaining quark matrix was adjusted to a fat content of 40% by weight in the dry matter and a protein content of 12% by weight by adding cream.

Tasting

The quark matrices were stored in a refrigerator at 10° C. for 24 hours, subsequently allowed to adapt to environment temperature for 5 minutes, and were then evaluated by 5 assessors for their taste and sensory properties, wherein the scale ranged from (1)="weakly present" to (5)="very pronounced". In addition, the sodium content of the products was determined. The results are summarised in Table 1. The average values of the tasting are indicated. Example 1 is according to the invention, examples V1 and V2 are for comparison purposes.

TABLE 1

| Results of the tasting | | | |
|---|---|---|---|
| | V1 | V2 | 1 |
| Taste evaluation | | | |
| bitter | 4.0 | 2.5 | 1.5 |
| grainy | 4.0 | 2.5 | 1.5 |
| fresh | 2.0 | 4.0 | 4.5 |
| Sensory evaluation | | | |
| creamy | 2.5 | 4.0 | 4.5 |
| soft | 2.5 | 4.0 | 4.0 |
| Sodium content [ppm] | Not determined | 145 | 34 |

In comparison with the closest state of the art, the product according to the invention is not only characterised in that it has a sodium content that is reduced by more than ¾, but it is also perceived to be less bitter and less grainy during the tasting, and tends to be more fresh and more creamy.

In the following, the processes according to examples 1 as well as V1 and V2 are schematically explained in FIG. 1. Here, the abbreviations have the following meaning:
T=Heat treatment (denaturation)
FM=Fermentation
SP=Separation
ST=Standardisation
UF=Ultrafiltration
NF=Nanofiltration
DM=Demineralisation
MX=Mixing
ED=Electrodialysis

The invention claimed is:

1. A low-mineral quark matrix, obtained by the combination of the following order of processing steps:
   (a) subjecting raw milk to heat treatment, and separating the cream, to obtain a skimmed milk,
   (b) subjecting the skimmed milk such obtained to an ultrafiltration step and/or a reverse osmosis step, producing a retentate R1, which represents a dairy protein concentrate, and a permeate P1,
   (c) subjecting the permeate P1 to an electrodialysis step practically completely removing monovalent and divalent ions to produce a salt-depleted diluate D1, wherein said step (c) is the sole demineralization step occurring in said processing,
   (d) combining the diluate D1 with the retentate R1,
   (e) subjecting the combination product thus obtained to heat treatment until denaturation sets in,
   (f) fermenting the denaturation product thus obtained by the addition of starter cultures and rennet, and
   (g) adjusting or standardising the fermentation product thus obtained to defined dry matter and protein content,
   wherein the quark matrix thus obtained has a sodium content of below 50 ppm, 15-20% by weight dry matter content and 10-15% by weight protein content, both reduced sodium content and mineral content together with improved sensory taste properties being less bitter, less grainy, more fresh, more creamy and softer.

2. A process for the production of a low-mineral quark matrix, comprising the combination of the following order of steps:

(a) producing a skimmed milk by heat treatment of raw milk and separation of the cream;
(b) subjecting the skimmed milk thus obtained to an ultrafiltration and/or reverse osmosis step, obtaining a retentate R1, which represents a dairy protein concentrate, and a permeate P1,
(c) subjecting the permeate P1 to an electrodialysis step practically completely removing monovalent and divalent ions to obtain a salt-depleted diluate D1, wherein said step (c) is the sole demineralization step occurring in said process,
(d) combining the diluate D1 with the retentate R1,
(e) heat treating the combination product thus obtained until denaturation sets in,
(f) fermenting the denaturation product thus produced by adding starter culture and rennet,
(g) adjusting or standardising the fermentation product thus obtained to defined dry matter and protein content, and
(h) obtaining a quark matrix with a sodium content of below 50 ppm, 15-20% by weight dry matter content and 10-15% by weight protein content, both reduced sodium content and mineral content together with improved sensory taste properties being less bitter, less grainy, more fresh, more creamy and softer.

3. The process of claim 2, wherein ultrafiltration is performed using membranes having a cut-off of 1,000 to 50,000 Dalton.

4. The process of claim 2, wherein ultrafiltration is performed using spiral coil modules and/or plate and frame modules.

5. The process of claim 2, wherein ultrafiltration is performed at a temperature within the range of 10 to 55° C.

6. The process of claim 2, wherein reverse osmosis is performed using semi-permeable membranes having a cut-off of 0 to 1,000 Dalton.

7. The process of claim 2, wherein reverse osmosis is performed at a temperature within the range of 10 to 55° C.

8. The process of claim 2, wherein the diluate of electrodialysis is subsequently treated using a cation exchanger.

9. The process of claim 2, wherein the combination product of the diluate D1 and the retentate R1 is subjected to a heat treatment step of 85 to 90° C. for a period of 5 to 10 min, denaturing the same in the process.

10. The process of claim 2, wherein the culture and rennet are added to the denaturation product at 25 to 35° C.

11. The process of claim 2, wherein the culture used is at least one of the two following mixtures 1 or 2:

Mixture 1
(i-1) *Streptococcus thermophilus,*
(i-2) *Leuconostoc* species,
(i-3) *Lactococcus lactis* subsp. *lactis biovar diacetylactis,*
(i-4) *Lactococcus lactis* subsp. *lactis und*
(i-5) *Lactococcus lactis* subsp. *cremoris,* and Mixture 2
(ii-1) *Streptococcus thermophilus,*
(ii-2) *Lactococcus lactis* subsp. *lactis und*
(ii-3) *Lactococcus lactis* subsp. *Cremoris.*

12. The process of claim 2, wherein the fermentation product is adjusted by adding a portion of the cream fraction from step (a).

13. A low-sodium food product, containing the quark matrix of claim 1.

* * * * *